J. A. WIBLE.
SPRING WHEEL.
APPLICATION FILED SEPT. 15, 1909.
976,762.
Patented Nov. 22, 1910.
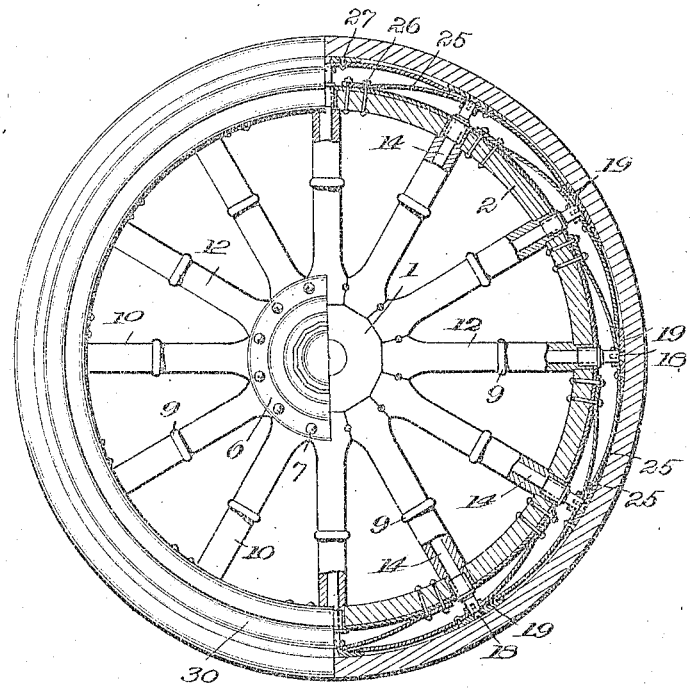
Fig. 1.
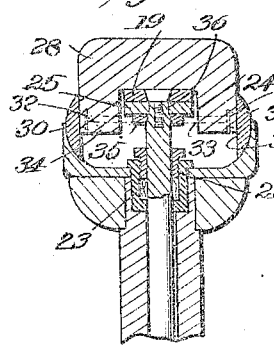
Fig. 3.
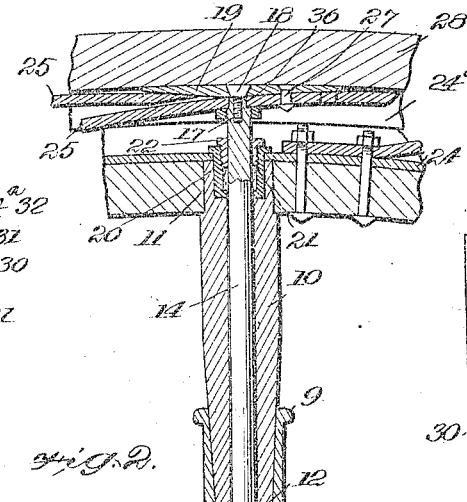
Fig. 2.
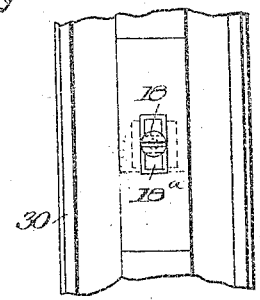
Fig. 4.
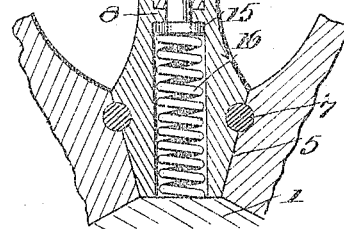
WITNESSES
INVENTOR
JAMES A. WIBLE
BY
ATTORNEYS

UNITED STATES PATENT OFFICE.

JAMES A. WIBLE, OF OAKDALE, PENNSYLVANIA.

SPRING-WHEEL.

976,762.

Specification of Letters Patent. Patented Nov. 22, 1910.

Application filed September 15, 1909. Serial No. 517,804.

*To all whom it may concern:*

Be it known that I, JAMES A. WIBLE, a citizen of the United States, and a resident of Oakdale, in the county of Allegheny and State of Pennsylvania, have made certain new and useful Improvements in Spring-Wheels, of which the following is a specification.

My invention is an improvement in spring wheels, and consists in certain novel constructions and combinations of parts, hereinafter described and claimed.

The object of the invention is to provide a device of the character specified, having a cushion between the rim and the hub which will closely approximate to the pneumatic tire in resiliency without the defects thereof.

Referring to the drawings forming a part hereof, Figure 1 is a side view of a wheel provided with the improvement shown partly in section. Fig. 2 is a central longitudinal section of a spoke and the adjacent portion of the rim and hub, Fig. 3 is a transverse section of the rim and a portion of a spoke, and Fig. 4 is a plan view of a portion of the wheel with the outer rim removed.

The present embodiment of the invention comprises a hub 1, and an inner rim 2, which are connected by a plurality of spokes, each of which is hollow as shown, and consists of an inner section or sleeve 4, the sides of whose inner ends are beveled as at 5 for engaging the edges of the adjacent spokes as shown in Figs. 1 and 2.

The inner ends of the sleeves are received within the hub, between the side plates 6 thereof, and bolts 7 extend through the side plates between the spokes as shown to secure them in place. Each sleeve is provided at approximately its longitudinal center with a diaphragm 8 for a purpose to be presently described and at its outer end with an annular bead 9.

The outer end of the outer section 10 of each spoke is received in an opening 11 in the inner rim which is preferably of wood, and the inner end is tapered as at 12 and is received in the similarly tapered opening of the inner section, the end of the outer section fitting against the diaphragm as shown.

An outer rim to be presently described is arranged concentric with the inner rim, and in spaced relation, and a preferably steel concave facing 24 is seated on the outer face of the inner rim. A plurality of radial rods or plungers 14 are connected with the outer rim, one rod being provided for each spoke and extending into the opening therethrough.

The inner end of each rod extends through the diaphragm and is headed as at 15, and a coil spring 16 is arranged between the head and the periphery of the hub. The outer end of each rod is provided with a longitudinal threaded recess 17, and a screw 18 extends through a longitudinal slot 18ª in a plate spring 19 and into the recess, the sides of the slot being countersunk, so that the head of the screw is flush with the outer face of the spring.

A stuffing box encircles each plunger, the outer casing 20 thereof having a threaded portion 21 which engages an opening in the facing, and the nut 22 being threaded into the outer casing, while a packing 23 is inclosed in the casing.

A plurality of leaf springs 25 are arranged between the plate springs 19 and the facing 24, the inner end of each spring being bolted to the facing as at 26, and the outer end being riveted to the plate spring as at 27. The springs 25 are arranged in overlapping relation, and with the outer end of each opposite the inner end of the next succeeding one.

A solid rubber tire 28 is provided with an annular groove 24ª, in which are riveted the plate springs and the leaf springs, and annular ring plates or cheek pieces 30 are arranged on each side of the tire. The outer faces of the plates or cheek pieces are convex as shown at 31, and fit the inner faces of the edges of the facing, the outer edges of the plates extending well up on the sides of the tire.

The ring plates or cheek pieces are secured to the edges of the facing by right and left hand screws 32, and a bolt 33 is passed through the overhanging edges 34 of the solid tire, passing just inside of the springs 19 and 25, for holding the tire in place. It will be understood that the said springs form the before mentioned rim upon which the tire rests.

A nut 35 is threaded on the end of each plunger, and the said plunger is reduced as at 36 outside of the nut to form a shoulder upon which rest the springs 25 and 19, the end of the rod passing through both springs. It will be observed that the above described construction forms a very firm support for the outer solid tire, the springs overlapping at their ends to form a practically continuous rim, the parts of which however are movable on each other.

The construction described forms in fact a jointed or sectional rim. The wheel as a whole consists of an inner rim rigidly connected with the hub, and an outer rim cushioned against the inner rim, and also against the hub, thus dividing the strain.

In operation, that portion of the solid tire which rests upon the ground is moved toward the hub, the movement being permitted by the springs 19 and 25, and the coil springs. The compression of the outermost rim, formed by the springs 19 and 25, is permitted by this peculiar arrangement, so that the outer rim is cushioned not only against the hub and the inner rim, but against itself.

I claim—

1. A spring wheel comprising a hub, a rim, a plurality of hollow spokes connecting the hub and the rim, each of said spokes having near its inner end a diaphragm provided with a central opening, a rod in each spoke having a headed end inside of the diaphragm, a coil spring between the headed end and the hub, a concave facing on the rim, a plate spring connected with the outer end of each rod, a leaf spring connecting each plate spring with the facing, said leaf springs being arranged in overlapping relation and with the outer end of one opposite the inner end of the succeeding one, a solid tire having a groove in its inner face seated on the springs, the springs being received in the groove, bolts passing through the sides of the groove and across the same inside of the springs, and ring plates on each side of the tire and seated inside the edges of the facing.

2. A spring wheel comprising a rim, a hub, and hollow spokes connecting the rim and the hub, a rod slidable in each spoke, a spring between the inner end of each rod and the hub, a tire having a groove on its inner face, a plate spring arranged in the groove adjacent to each spoke, and a leaf spring connecting the outer end of each rod and the adjacent plate spring with the outer face of the rim, said springs being inclined with respect to the rim.

JAMES A. WIBLE.

Witnesses:
W. J. CASSIDY,
B. M. HOPPER.